(12) United States Patent
Brahmaroutu

(10) Patent No.: US 7,243,160 B2
(45) Date of Patent: Jul. 10, 2007

(54) METHOD FOR DETERMINING MULTIPLE PATHS BETWEEN PORTS IN A SWITCHED FABRIC

(75) Inventor: Surender V. Brahmaroutu, Steilacoom, WA (US)

(73) Assignee: Intel Corporation, Santa Clara, CA (US)

( * ) Notice: Subject to any disclaimer, the term of this patent is extended or adjusted under 35 U.S.C. 154(b) by 862 days.

(21) Appl. No.: 09/852,028

(22) Filed: May 10, 2001

(65) Prior Publication Data

US 2003/0033427 A1   Feb. 13, 2003

(51) Int. Cl.
*G06F 15/173* (2006.01)

(52) U.S. Cl. ............... 709/238; 709/239; 709/241; 370/237; 370/238

(58) Field of Classification Search ........... 709/238, 709/239, 242, 249, 220–222, 227, 228, 231, 709/235, 241; 370/351–353, 355–357, 386, 370/389, 392, 229, 231, 237, 238
See application file for complete search history.

(56) References Cited

U.S. PATENT DOCUMENTS

| | | | | |
|---|---|---|---|---|
| 5,088,091 A | * | 2/1992 | Schroeder et al. | 370/406 |
| 5,138,615 A | * | 8/1992 | Lamport et al. | 370/400 |
| 5,485,455 A | * | 1/1996 | Dobbins et al. | 370/255 |
| 5,521,910 A | * | 5/1996 | Matthews | 370/256 |
| 5,796,736 A | * | 8/1998 | Suzuki | 370/254 |
| 5,825,772 A | * | 10/1998 | Dobbins et al. | 370/396 |
| 5,881,243 A | * | 3/1999 | Zaumen et al. | 709/241 |
| 5,933,425 A | * | 8/1999 | Iwata | 370/351 |
| 6,041,049 A | * | 3/2000 | Brady | 370/351 |
| 6,069,895 A | * | 5/2000 | Ayandeh | 370/399 |
| 6,256,295 B1 | * | 7/2001 | Callon | 370/254 |
| 6,260,072 B1 | * | 7/2001 | Rodriguez-Moral | 709/241 |

(Continued)

FOREIGN PATENT DOCUMENTS

WO   WO 03/056758 A1 * 12/2001

OTHER PUBLICATIONS

Yufei Wang; Zheng Wang; "Explicit routing algorithms for Internet traffic engineering" Computer Communications and Networks, 1999. Proceedings. Eight International Conference on , Oct. 11-13, 1999 pp. 582-588.*

(Continued)

*Primary Examiner*—Jason Cardone
*Assistant Examiner*—Jeffrey R. Swearingen
(74) *Attorney, Agent, or Firm*—Robert D. Anderson

(57) ABSTRACT

A mechanism provided to program forwarding tables for switches in a subnet of a switched fabric including at least a host system, a target system and switches each having one or more ports interconnected via links for multipathing. Such a mechanism may be installed in a host system to determine all possible links between all ports on the subnet during topology discovery; create an all port connectivity table which records all port-to-port connectivity information; create an all switch shortest paths table which records all the shortest paths between every switch pair on the subnet based the port-to-port connectivity information; and compute forwarding tables for respective switches on the subnet that allow usage of multiple paths between port pairs based on the port-to-port connectivity information and based on the shortest paths between every switch pair.

25 Claims, 7 Drawing Sheets

U.S. PATENT DOCUMENTS

| | | | |
|---|---|---|---|
| 6,333,918 B1 * | 12/2001 | Hummel | 370/238 |
| 6,347,078 B1 * | 2/2002 | Narvaez-Guarnieri et al. | 370/230 |
| 6,563,798 B1 * | 5/2003 | Cheng | 370/255 |
| 6,600,724 B1 * | 7/2003 | Cheng | 370/256 |
| 6,628,649 B1 * | 9/2003 | Raj et al. | 370/360 |
| 6,694,361 B1 * | 2/2004 | Shah et al. | 709/222 |
| 6,851,059 B1 * | 2/2005 | Pfister et al. | 713/200 |

OTHER PUBLICATIONS

Narvaez, Paolo et al. "New Dynamic Algorithms for Shortest Path Tree Computation". IEEE/ACM Transactions on Networking (TON). IEEE Press. Dec. 2000. vol. 8, Issue 6, pp. 734-746.*

Rodeheffer, Thomas L. et al. "SmartBridge : A Scalable Bridge Architecture". Proceedings of the Conference on Applications, Technologies, Architectures, and Protocols for Computer Communcation. ACM Press. Stockholm, Sweden. 2000. pp. 205-216.*

* cited by examiner

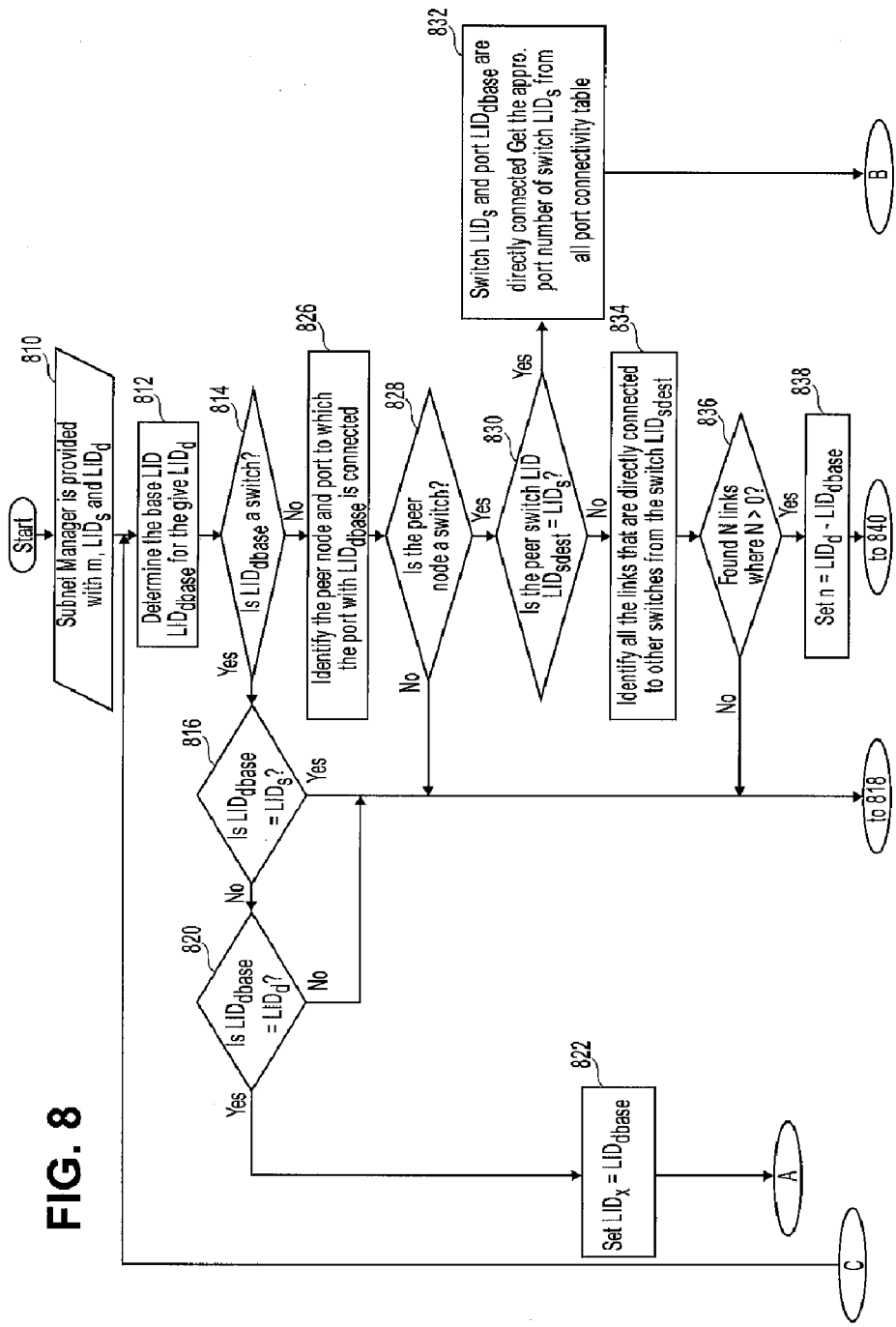

METHOD FOR DETERMINING MULTIPLE PATHS BETWEEN PORTS IN A SWITCHED FABRIC

TECHNICAL FIELD

The present invention relates to data transfer interface technology in a data network, and more particularly, relates to a method for determining a number of possible multiple paths for a given port in a switched fabric.

BACKGROUND

Computer input/output (I/O) performance has become crucial to applications today because of the use of the Internet, intranets, and extranets. Key applications deployed in most Information Technology (IT) enterprises are typically predicated upon I/O subsystem performance in handling key I/O tasks to deliver data to and from computer's main CPU. These applications may include all Internet applications ranging from Web severs to Internet-based e-commerce and TCP/IP network handling, mail and messaging, on-line transaction processing, and key packaged decision-support applications. Other IT infrastructure changes have also increased the burden on computer server I/O.

Emerging solutions to many of the current server I/O shortcomings include InfiniBand™ and its predecessor, Next Generation I/O (NGIO) which have been developed by Intel Corp. and other companies to provide a standard-based I/O platform that uses a channel oriented, switched fabric and separate I/O channels to meet the growing needs of I/O reliability, scalability and performance on commercial high-volume servers, as set forth in the "*Next Generation Input/Output (NGIO) Specification*," NGIO Forum on Jul. 20, 1999 and the "*InfiniBand™ Architecture Specification*," the InfiniBand™ Trade Association on Oct. 24, 2000. NGIO/InfiniBand™ introduces the use of an efficient engine that is coupled to host memory which replaces shared buses with a fabric of switchable point-to-point links. This approach decouples the CPU from the I/O subsystem and addresses the problems of reliability, scalability, modular packaging, performance and complexity. Communication between CPU and peripherals occurs asynchronously with the I/O channel engine. The I/O channel engine is utilized to transport data to and from main memory and allow the system bus to act as a switch with point-to-point links capable of near linear scaling with CPU, memory and peripheral performance improvements.

One major challenge to implementing a data network which utilizes an NGIO/InfiniBand™ architecture is to ensure that data messages traverse reliably between given ports of a data transmitter (source node) and a data receiver (destination node), via one or more given transmission (redundant) links.

Since NGIO/InfiniBand™ is an emerging technology not yet in the marketplace, there is no known interface mechanism specifically implemented for NGIO/InfiniBand™ applications. In addition, there is no known procedure to determine the number of possible multiple paths for a given port and program switch forwarding tables for switches that allows usages of multiple paths between port pairs in a channel-based, switched fabric data network.

Accordingly, there is a need for a mechanism for determining the number of possible multiple paths for a given port and programing switch forwarding tables for switches that allows usages of multiple paths between port pairs in a channel-based, switched fabric data network.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and Server Net and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
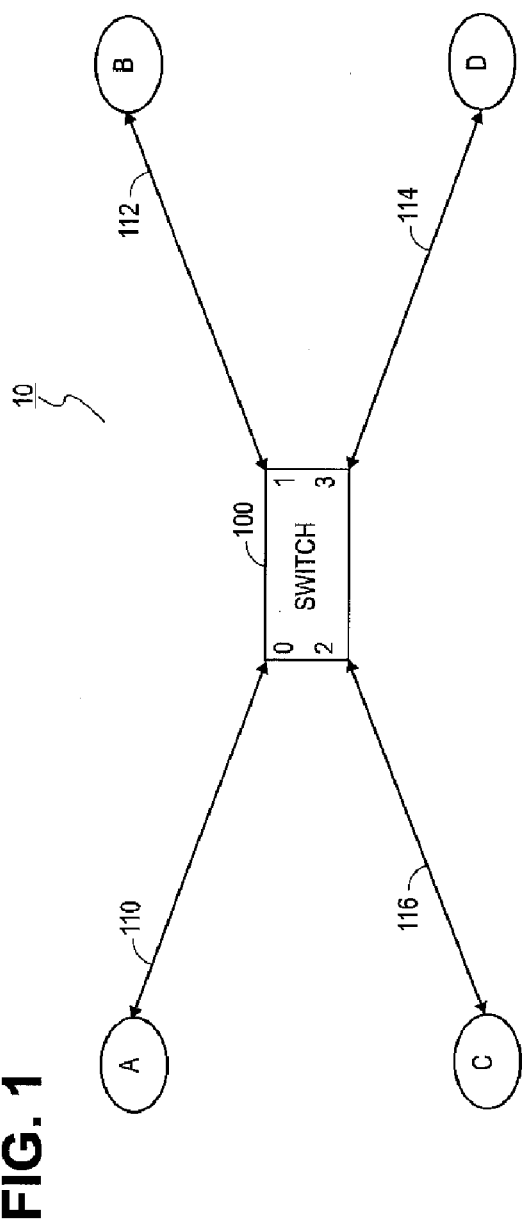
FIG. 1 illustrates a simple data network having several interconnected nodes for data communications according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 116, and 114. Each physical link may support a number of logical point-to-point channels. Each channel may be a bi-directional communication path for allowing commands and data messages to flow between two connected nodes (e.g., host systems, switch/switch elements, and I/O units) within the network.

Each channel may refer to a single point-to-point connection where data may be transferred between end nodes (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end nodes or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the end nodes (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association on Oct. 24, 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the end node may be a host system including one or more host channel adapters (HCAs), or a remote system such as an I/O unit including one or more target channel adapters (TCAs). Both the host channel adapter (HCA) and the target channel adapter (TCA) may be broadly considered as fabric (channel) adapters provided to interface end nodes to the NGIO/InfiniBand™ switched fabric, and may be implemented in compliance with "*Next Generation I/O Link Architecture Specification: HCA Specification, Revision 1.0*", and the "*InfiniBand™ Specification*" and the "*InfiniBand™ Link Specification*" for enabling the end nodes (endpoints) to communicate to each other over an NGIO/InfiniBand™ channel(s) with minimum data transfer rates of up to 2.5 gigabit per second (Gbps), for example.

Figure 2:
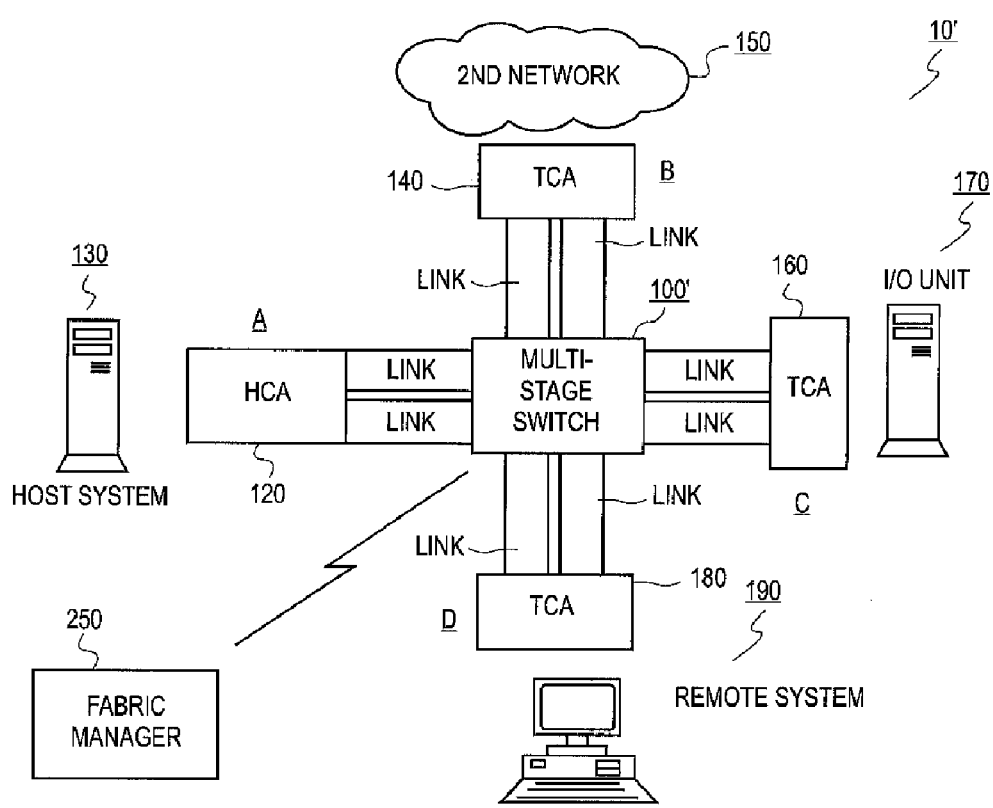
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' for allowing a host system and a remote system to communicate to a large number of other host systems and remote systems over one or more designated channels. A channel connection is simply an abstraction that is established over a switched fabric 100' to allow work queue pairs (WQPs) at source and destination end nodes (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end nodes or end stations, switches and links may be used for relaying data in groups of packets between the end stations and switches via corresponding NGIO/InfiniBand™ links. A link can be a copper cable, an optical cable, or printed circuit wiring on a backplane used to interconnect switches, routers, repeaters and channel adapters (CAs) forming the NGIO/InfiniBand™ switched fabric 100'.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO/InfiniBand™ switched fabric 100' which serve as intermediate nodes between the host system 130 and the remote systems 150, 170 and 190.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices)

of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as channel adapters (CAs) (also known as fabric adapters) provided to interface either the host system 130 or any one of the remote systems 150, 170 and 190 to the switched fabric 100', and may be implemented in compliance with "*Next Generation I/O Link Architecture Specification: HCA Specification, Revision 1.0*" and the "*InfiniBand™ Architecture Specification*" for enabling the end nodes (endpoints) to communicate on one or more an NGIO/InfiniBand™ link(s). Individual channel adapters (CAs) and switches may have one or more connection points known as ports for establishing one or more connection links between end nodes (e.g., host systems and I/O units).

The multi-stage switched fabric 100' may include one or more subnets interconnected by routers in which each subnet is composed of switches, routers and end nodes (such as host systems or I/O subsystems). In addition, the multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions.

If the multi-stage switched fabric 100' represents a single subnet of switches, routers and end nodes (such as host systems or I/O subsystems) as shown in FIG. 2, then the fabric manager 250 may alternatively be known as a subnet manager (SM). The fabric manager 250 may be a software module configured for learning or discovering fabric (network) topology, assigning unique addresses known as Local Identifiers (LID) to all ports that are connected to the subnet, determining the switch forwarding tables (forwarding database), detecting and managing faults or link failures in the network and performing other network management functions. Such a software module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric (subnet) administrator to conveniently plug-in or download into an existing operating system (OS). Alternatively, the software module may also be bundled with the existing operating system (OS) which may be activated by a particular device driver for performing all network management functions in compliance with the NGIO/InfiniBand™ specification. However, NGIO/InfiniBand™ is merely one example embodiment or implementation of the present invention, and the invention is not limited thereto. Rather, the present invention may be applicable to a wide variety of any number of data networks, hosts and I/O units using industry specifications. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3:
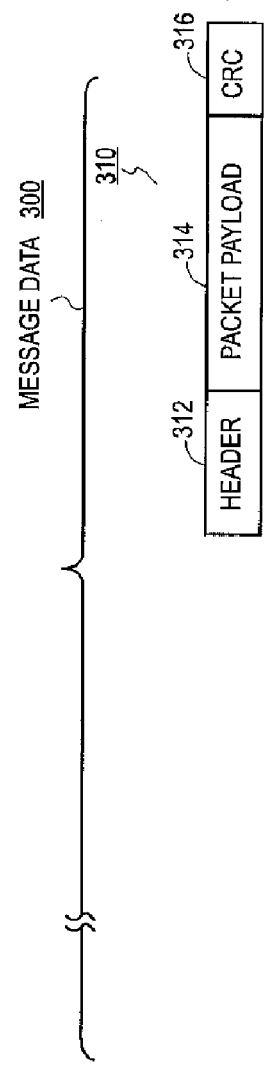
FIG. 3 illustrates an example packet of data messages transmitted from a source node (data transmitter) to a destination node (data receiver) in an example data network according to an embodiment of the present invention.

FIG. 3 illustrates an example packet format of message data transmitted from a source node (data transmitter) to a destination node (data receiver) through switches and/or intermediate nodes according to the "*InfiniBand™ Architecture Specification*" as set forth by the InfiniBand™ Trade Association on Oct. 24, 2000. As shown in FIG. 3, a message data 300 may represent a sequence of one or more data packets 310 (typically derived from data transfer size defined by a work request). Each packet 310 may include header information 312, variable format packet payload 314 and cyclic redundancy check (CRC) information 316. Under the "*Next Generation Input/Output (NGIO) Specification*" as previously set forth by the NGIO Forum on Jul. 20, 1999, the same data packets may be referred to as data cells having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ specification may include, for example, a local routing header, a global routing header, a base transport header and extended transport headers each of which contains functions as specified pursuant to the "*InfiniBand™ Architecture Specification*". For example, the local routing header may contain fields such as a destination local identifier (LID) field used to identify the destination port and data path in the data network 10', and a source local identifier (LID) field used to identify the source port (injection point) used for local routing by switches within the example data network 10' shown in FIG. 2.

Figure 4:
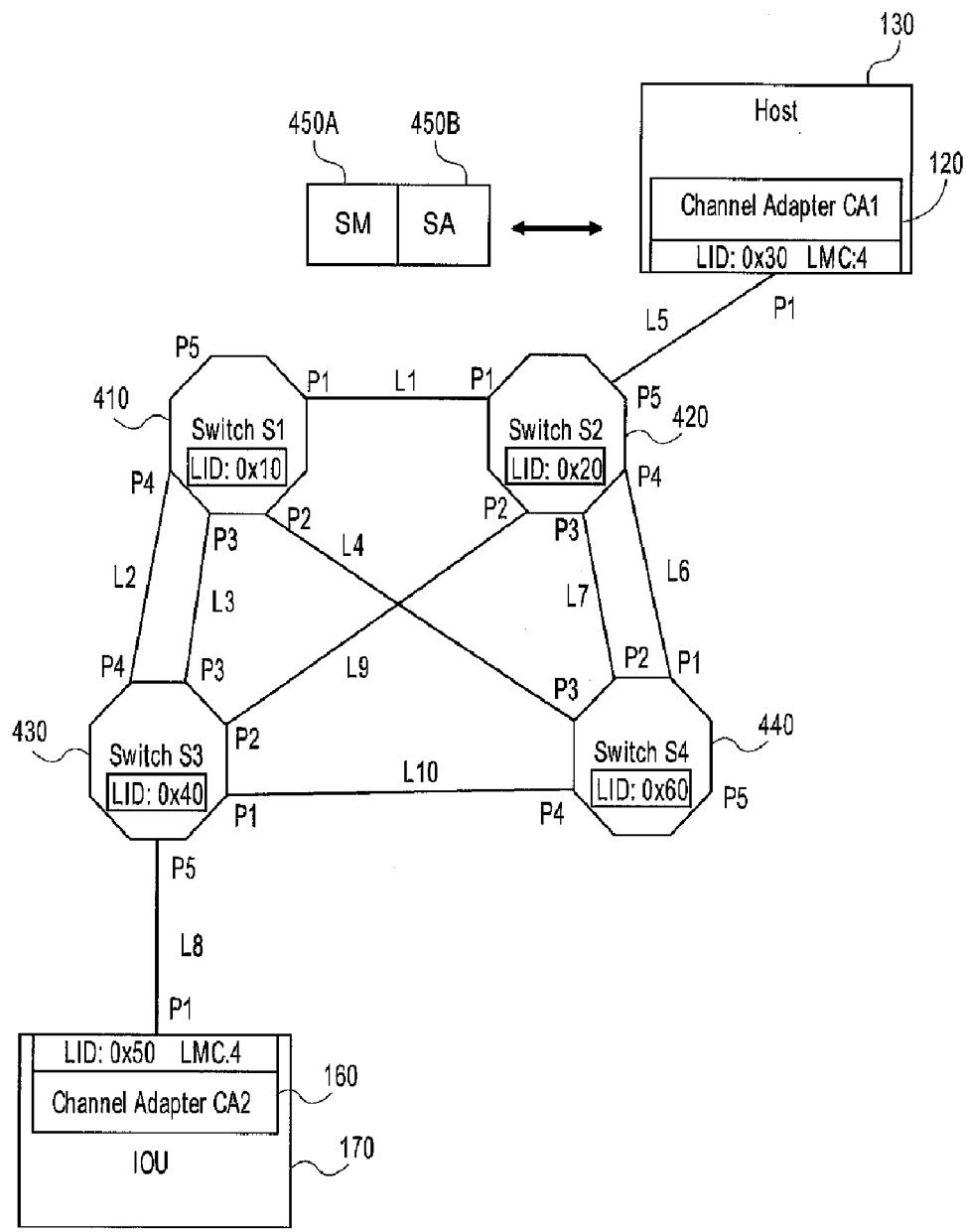
FIG. 4 illustrates an example InfiniBand™ Architecture (IBA) subnet including four (4) switches and two (2) channel adapters installed at respective host system and remote system (IO unit) according to an embodiment of the present invention.

Turning now to FIG. 4, an example InfiniBand™ Architecture (IBA) subnet including, for example, four (4) switches and two (2) channel adapters installed at respective host system 130 and remote IO unit 170 according to an embodiment of the present invention is illustrated. As shown in FIG. 4, the IBA subnet 400 may include a collection of switch (S1) 410, switch (S2) 420, switch (S3) 430 and switch (S4) 440 arranged to establish connection between the host system 130, via a channel adapter (CA1) 120 and the remote I/O unit 170, via a channel adapter (CA2) 160. Each switch as well as the channel adapter (CA) may have one or more connection points called "ports" provided to establish connection with every other switch and channel adapter (CA) in a system area network (SAN) via one or more link.

IBA management services may be provided by a local subnet manager (SM) 450A and a local subnet administrator (SA) 450B (i.e., the SM and SA for the subnet). The subnet manager (SM) 450A and the subnet administrator (SA) 450B may substitute the fabric manager 250 shown in FIG. 2, and may be a software module (i.e., an application program) installed to provide IBA management services for all switches and end nodes in the IBA subnet 400. The management services may be broadly classified into subnet services and general services. At a minimum the subnet services, offered by the subnet manager (SM) 450A, include discovering fabric topology, assigning unique addresses called Local Identifiers (LID) to all ports that are connected to the IBA subnet 400, programming switch forwarding tables (also known as routing table) and maintaining general functioning of the IBA subnet 400. Most of the data collected during discovery and that is used to configure the IBA subnet 400 may be assimilated by the subnet administrator (SA) 450B for providing access to information such as alternate paths between end nodes, and notification of events, including error detection, recovery procedures and notification. In one embodiment of the present invention, both the subnet manager (SM) 450A and the subnet administrator (SA) 450B may be installed at the host system 130 for managing all subnet management functions. However, the subnet manager (SM) 450A and the subnet administrator (SA) 450B may also be installed as part of any individual end node and switch.

Every switch and each port of every channel adapter (CA) may have one or more Local Identifiers (LIDs) assigned by the local subnet manager (SM) 450A for allowing multiple paths between end nodes such as the host system 130 and the remote IOU 170. Each port within an NGIO/InfiniBand™ switched fabric 100' supports a unique 16-bit LID, which is broken down in order to allow multipathing. Three (3) bits per port configuration known as LID Mask Control (LMC) indicate how many of the least significant bits are "Path Bits". The number of multiple paths between end nodes is equal to $2^{LMC}-1$, providing a Path Bit field between 0 to 7 bits. The remaining bits are "Base LID". This allows for up to 128 separate paths through the IBA subnet 400. Therefore, the InfiniBand™ Architecture allows the subnet manager (SM) 450A to assign up to 128 LIDs to a port.

If a port is assigned multiple LIDs, each LID assigned to the port represents a unique path to this port from some other port on the IBA subnet 400. Multiple paths will exist if the IBA subnet 400 contains multiple (redundant) links that connect switches S1–S4 or channel adapters CA1–CA2 together as shown, for example, in FIG. 4. The multiplicity of ports and paths through the IBA subnet 400 is utilized for both fault-tolerance by switching over the traffic from a failed path to a functional alternate path and increased data transfer bandwidth by distributing the load across multiple paths. To permit multipathing, the subnet manager (SM) 450A is required to identify all possible paths to a port from any other port on the IBA subnet 400, and then assign enough LIDs to the port such that a different LID can identify each path to this port. Any end node such as the host system 130 that wants to utilize multiple paths to reach a remote target node such as the IOU 170 can use different LIDs to specify different paths through the IBA subnet 400.

However, the number of possible paths from any given port to any other port in a subnet may vary depending upon how the IBA-compliant SAN components, such as channel adapters (CAs), switches, and routers from any set of vendors, are interconnected. As a result the number of possible paths may or may not be equal to the number of LIDs (the base LID and LMC combination) that the subnet manager (SM) 450A assigns to a port.

Referring back to FIG. 4, there are 6 different loopless paths between the host system 130 and the IOU 170 traversing a set of <L5, L9, L8>, <L5, L1, L2, L8>, <L5, L1, L3, L8>, <L5, L6, L10, L8>, <L5, L7, L10, L8> and <L5, L1, L4, L10, L8> links respectively. The LMC value for the two CA ports is, however, programmed to be four (4) which allows 16 different paths each represented by a unique LID and LMC combination. Therefore, the channel adapter (CA1) 120 of the host system 130 and the channel adapter (CA2) 160 of the remote IOU 170 can be addressed using any LID in the range 0x30–0x3F and 0x50–0x5F respectively. Each of these LIDs can potentially be used to reach the respective CA port. However, 10 out of possible 16 LID and LMC combinations do not represent any path between the channel adapter (CA1) 120 of the host system 130 and the channel adapter (CA2) 160 of the remote IOU 170 in this example.

According to the InfiniBand™ Architecture specification, there is no mechanism specified to assign multiple LIDs to a single port in an IBA subnet 400, nor is there any effective implementation of each LID/LMC combination that enables the usage of multiple paths. As a result problems associated with assigning multiple LIDs to a port need to be addressed in a systematic way when multiple LIDs are assigned to CA ports.

For example, when a client executing on the host system 130 queries the subnet administrator (SA) 450B for six (6) multiple paths, the subnet administrator (SA) 450B should provide valid LID values consistently. Also, if the client requests for more than six (6) paths, the subnet administrator (SA) 450B should respond indicating that the remote IOU 170 can only be reached via maximum 6 different paths. However, there is no mechanism provided by the InfiniBand™ Architecture specification in which each LID is mapped and identified to represent a specific path.

In addition, clients can utilize multiple paths effectively only when each path is attributed with relative importance. In the example shown in FIG. 4, in order to minimize single point failures and for reduced latency, a client executing on the host system 130 may prefer using the path traversing <L5, L9, L8>[via switch (S2) 420 and switch (S3) 430] over the one traversing <L5, L1, L4, L10, L8>[via switch (S2) 420, switch (S1) 410, switch (S4) 440, switch (S3) 430] for example. Thus, a mechanism is needed to differentiate one particular path from another path between the host system 130 and the remote IOU 170 based on some measurable metric.

Furthermore, each LID/LMC combination represent a path between any given pair of ports. However, there is no significance to the ordinal value of the LIDs. Thus, a definitive mechanism is likewise needed to associate significance to each LID and program individual switch to route data packets shown in FIG. 3 destined for these various LIDs representing the same port but follow different paths through the IBA subnet 400.

Figure 5:
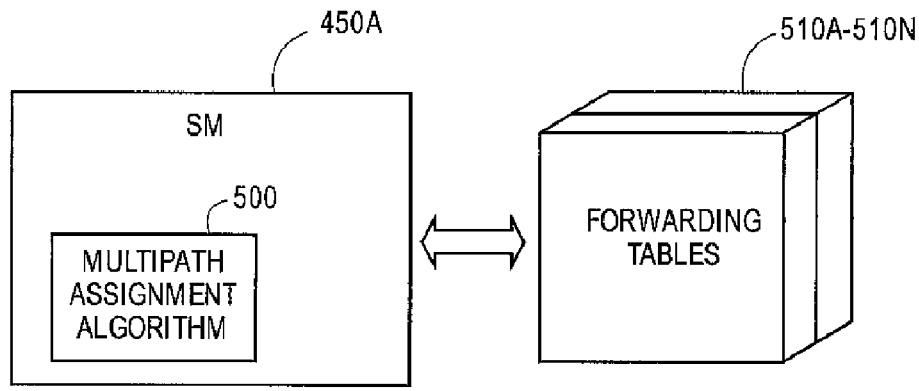
FIG. 5 illustrates an example subnet manager (SM) having a multipath assignment algorithm incorporated therein according to an embodiment of the present invention.

In order to address several problems associated with assigning multiple LIDs to a port as described, a multiple path assignment algorithm 500 may be incorporated into the subnet manager (SM) 450A as shown in FIG. 5 to identify all paths between a given port pair, to assign a LID/LMC combination consistently to a specific path, to differentiate one given path from another based on some measurable metric so as to program switch forwarding tables 510A–510N for the switch, for example, switch (S1) 410, switch (S2) 420, switch (S3) 430 and switch (S4) 440 to route data packets destined for various LIDs representing the same port but follow different paths through the IBA subnet 400. The subnet manager (SM) 450A is responsible for discovering the topology on power-up, assigning LID and LMC values to all the ports in the IBA subnet 400 and establishing possible paths among all ports by programming the switches, for example, switch (S1) 410, switch (S2) 420, switch (S3) 430 and switch (S4) 440 appropriately.

Figure 6:
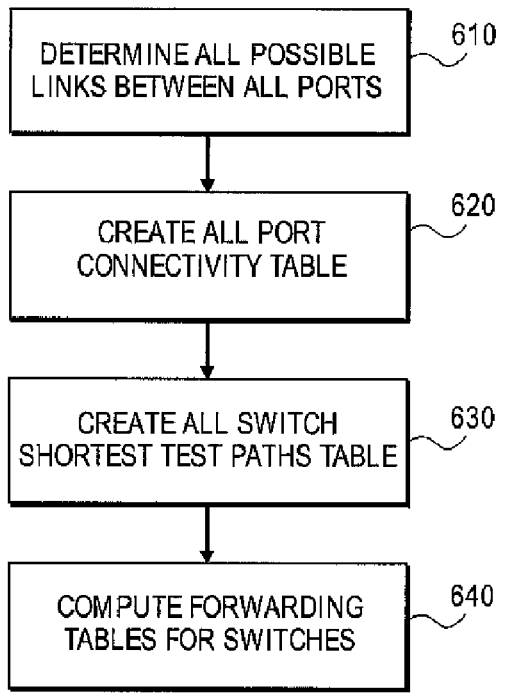
FIG. 6 illustrates an example high-level flowchart of an example subnet manager (SM) having a multipath assignment algorithm incorporated therein according to an embodiment of the present invention.

FIG. 6 illustrates a high-level flowchart of an example subnet manager (SM) 450A having a multipath assignment algorithm 500 incorporated therein according to an embodiment of the present invention. As shown in FIG. 6, the subnet manager (SM) 450A is configured to determine all possible physical links between all ports on the IBA subnet 400 as part of the topology discovery at block 610. This is typically done using directed route packets (e.g., transmission of subnet management packets to collect information of all ports on the IBA subnet 400) as described in the InfiniBand™ Architecture specification.

After all possible physical links between all ports on the IBA subnet 400 are determined, the subnet manager (SM)

450A then creates two different connectivity tables based on the information gathered during topology discovery. First, the subnet manager (SM) 450A creates an all-port connectivity table which records all port-to-port connectivity information at block 620. The subnet manager (SM) 450A then creates an all-switch shortest paths table which records all the shortest paths between every switch pair at block 630.

More specifically, the port-to-port connectivity information is recorded into an all-port connectivity table as shown in TABLE 1. The subnet manager (SM) 450A then computes and records a second table containing all-switch shortest paths as shown in TABLE 2 by utilizing the data recorded in TABLE 1.

| Source Base LID | Source Port | Dest Base LID | Dest Port |
|---|---|---|---|
| 0 × 10 | P1 | 0 × 20 | P1 |
| 0 × 10 | P2 | 0 × 60 | P3 |
| 0 × 10 | P3 | 0 × 40 | P3 |
| 0 × 10 | P4 | 0 × 40 | P4 |
| 0 × 10 | P5 | 0 × 0 | 0 |
| 0 × 20 | P1 | 0 × 10 | P1 |
| 0 × 20 | P2 | 0 × 40 | P2 |
| 0 × 20 | P3 | 0 × 60 | P2 |
| 0 × 20 | P4 | 0 × 60 | P1 |
| 0 × 20 | P5 | 0 × 30 | P1 |
| 0 × 30 | P1 | 0 × 20 | P5 |
| 0 × 40 | P1 | 0 × 60 | P4 |
| 0 × 40 | P2 | 0 × 20 | P2 |
| 0 × 40 | P3 | 0 × 10 | P3 |
| 0 × 40 | P4 | 0 × 10 | P4 |
| 0 × 40 | P5 | 0 × 50 | P1 |
| 0 × 50 | P1 | 0 × 40 | P5 |
| 0 × 60 | P1 | 0 × 20 | P4 |
| 0 × 60 | P2 | 0 × 20 | P3 |
| 0 × 60 | P3 | 0 × 10 | P2 |
| 0 × 60 | P4 | 0 × 40 | P1 |
| 0 × 60 | P5 | 0 × 0 | 0 |

All Port Connectivity Table for the Example IBA Subnet Shown in FIG. 4

TABLE 1 shows the connection status of all ports discovered in the example subnet 400 shown in FIG. 4. Each switch, for example, switch (S1) 410, switch (S2) 420, switch (S3) 430, and switch (S4) 440 shown in FIG. 4, has 5 ports and channel adapter (CA1 or CA2) a single port although an IBA subnet 400 may contain many switches and channel adapters (CAs) consisting of variable number of ports. Note that some ports may be down at any given time.

The first two columns in TABLE 1 list source port LIDs and source port numbers respectively. Likewise, the third and fourth columns in TABLE 1 list the destination port LIDs and destination port numbers respectively. For a port that is down, the corresponding destination port LID and source port number are set to "0" and "0" respectively.

The example shown in FIG. 4 is a simple IBA subnet configuration consisting of only four (4) switches and only two (2) channel adapters (CAs). There are six (6) acyclic paths between the two (2) channel adapters (CAs). However, as the IBA subnet 400 grows by adding more switches and links, the number of paths between the two (2) channel adapters (CAs) will increase. In general, for a large IBA cluster, the number of distinct paths between any port pair can increase drastically. The buffer management used to calculate the forwarding tables 510A–510N will become extremely complicated if the subnet manager (SM) 450A has to detect and administer all paths between all possible port pairs in a given subnet. Typically, the sum of all active CA ports is much higher than the switches in a subnet. Thus the complexity of identifying multiple paths and programming switches is reduced drastically if the subnet manager (SM) 450A bases the calculations on a small set of switch-to-switch connectivity data as opposed to all port-to-port connectivity data as shown in TABLE 1.

Then the subnet manager (SM) 450A extracts switch-to-switch only connectivity information from the all-port connectivity data from the TABLE 1. The subnet manager (SM) 450A builds a two-dimensional all switch shortest path table that contains cost metric for the shortest path from each switch to every other switch as shown in the TABLE 2. The subnet manager (SM) 450A may use any well-known APSP (All Pair Shortest Paths) algorithm in order to compute the shortest paths between every switch pair. The function used to compute the shortest paths between switches is denoted as Fn( ) in TABLE 2 herein below.

| | 0 × 10 | | 0 × 20 | | 0 × 40 | | 0 × 60 | |
|---|---|---|---|---|---|---|---|---|
| Switch LID | Port | Cost | Port | Cost | Port | Cost | Port | Cost |
| 0 × 10 | 0 | ∞ | P1 | Fn(S1, P1, S2) | P3 | Fn(S1, P3, S3) | P1 | Fn(S1, P2, S4) |
| 0 × 20 | P1 | Fn(S2, P1, S1) | 0 | ∞ | P2 | Fn(S2, P2, S3) | P3 | Fn(S2, P3, S4) |
| 0 × 40 | P1 | Fn(S3, P1, S1) | P2 | Fn(S3, P2, S2) | 0 | ∞ | P1 | Fn(S3, P1, S4) |
| 0 × 60 | P3 | Fn(S4, P3, S1) | P1 | Fn(S4, P1, S2) | P4 | Fn(S4, P4, S3) | 0 | ∞ |

All Switch Shortest Paths Table for the Example IBA Subnet Shown in FIG. 4

TABLE 2 shows all switch shortest paths of all ports discovered in the example subnet shown in FIG. 4. The first column in the TABLE 2 consists of a list of source switch LIDs. Each of the following columns consists of a <Port, Cost> duple representing the shortest path from the source to the destination switch. Source switch and destination switch may correspond to any one of switch (S1) 410, switch (S2) 420, switch (S3) 430 and switch (S4) 440 in the IBA subnet 400 shown in FIG. 4.

Port is the port number of the source switch, for example, switch (S1) 410, switch (S2) 420, switch (S3) 430 and switch (S4) 440, where the path originates. For example, the port number of each source switch (S1) 410, source switch (S2) 420, source switch (S3) 430, source switch (S4) 440 as shown in FIG. 4 is P1, P2, P3, P4 and P5.

Cost is the path cost metric that is computed considering several factors. The function that computes the cost value may include, for example, hop count, MTU (Maximum Transfer Unit) size, link speed, width and other port and link characteristics.

Hop count of a path is defined as the number of physical links that connect intermediate switches along its route.

MTU is the maximum size of the packet payload of data packets as shown in FIG. 3 supported along a path from source node to destination node. The path that originates from and destined to the same switch is denoted by a non-existent port number "0" and an infinite cost value "∞". More than one path can potentially exist between any given two switches due to the way switches are interconnected. However, only the paths with the least cost value are chosen and entered into TABLE 2.

For example, if the source switch is switch (S2) 420 having a LID of "0x20", and the destination switch is switch (S3) 430 having a LID of "0x40", then the port number of the source switch where the path originates as shown in TABLE 2 will be "P2". The cost value estimated will be Fn(S3, P2, S2) based on the hop count, the MTU (Maximum Transfer Unit) size, the link speed, the width and other port and link characteristics.

Also, there can be more than one path with identical cost values between switches. In such cases, the path that connects to a port with the least port number ordinal value on a switch with the smaller LID is selected as shown in TABLE 2.

For instance, switch (S1) 410 and switch (S3) 430 are connected by two physical links L2 and L3 without any hops. After considering all other cost function parameters, and assuming that these two paths between switch (S1) 410 and switch (S3) 430 have identical cost metrics, the all-switch shortest paths table (TABLE 2) records the data on L2 as it originates from port, "P3" (as opposed to port, "P4") of switch (S1) 410, the LID of which is lower than that of switch (S3) 430.

The subnet manager (SM) 450A then executes the multipath assignment algorithm 500 shown in FIG. 5 to program and download linear switch forwarding tables 510A–510N to the switches, for example, switch (S1) 410, switch (S2) 420, switch (S3) 430 and switch (S4) 440 in the IBA subnet 400 in order to ensure loop-less paths and allow CA ports to be addressed by multiple LIDs. The multipath assignment algorithm 500 may also be executed (activated) by the subnet manager (SM) 450A, when a topology change occurs (e.g. due to an existing link going down or a new link being inserted).

The all-port connectivity and all-switch shortest paths tables (TABLE 1 and TABLE 2) are the only set of data needed by the subnet manager (SM) 450A to build switch forwarding tables 510A–510N for switches, for example, switch (S1) 410, switch (S2) 420, switch (S3) 430 and switch (S4) 440 in the IBA subnet 400. The subnet manager (SM) 450A keeps the all-port connectivity and all-switch shortest paths tables (TABLE 1 and TABLE 2) constantly updated reflecting any dynamic changes to the subnet topology.

The steps taken by the multipath assignment algorithm 500 to program switch forwarding tables 510A–510N in an IBA subnet 400 that allows usage of multiple paths between port pairs are described with reference to FIGS. 7 and 8 herein below.

The multipath assignment algorithm 500 shown in FIG. 5 calculates the switch forwarding tables 510A–510N based on the switch connectivity information. The multipath assignment algorithm 500 is based on the principle that only the shortest path between a given port pair is guaranteed to overlap with other shortest paths that either originate from or destined to some intermediate port that exists on the shortest path between the original port pair. Relative importance of paths is always subjective to where the path originates.

For instance, if the second best path to a specific destination crosses several intermediate switches, the second best paths from those various intermediate switches to the same destination may not follow the same path. Thus, the subnet manager (SM) 450A can program the switch forwarding tables 510A–510N without any routing ambiguity only when it chooses shortest paths between switches.

Figure 7:
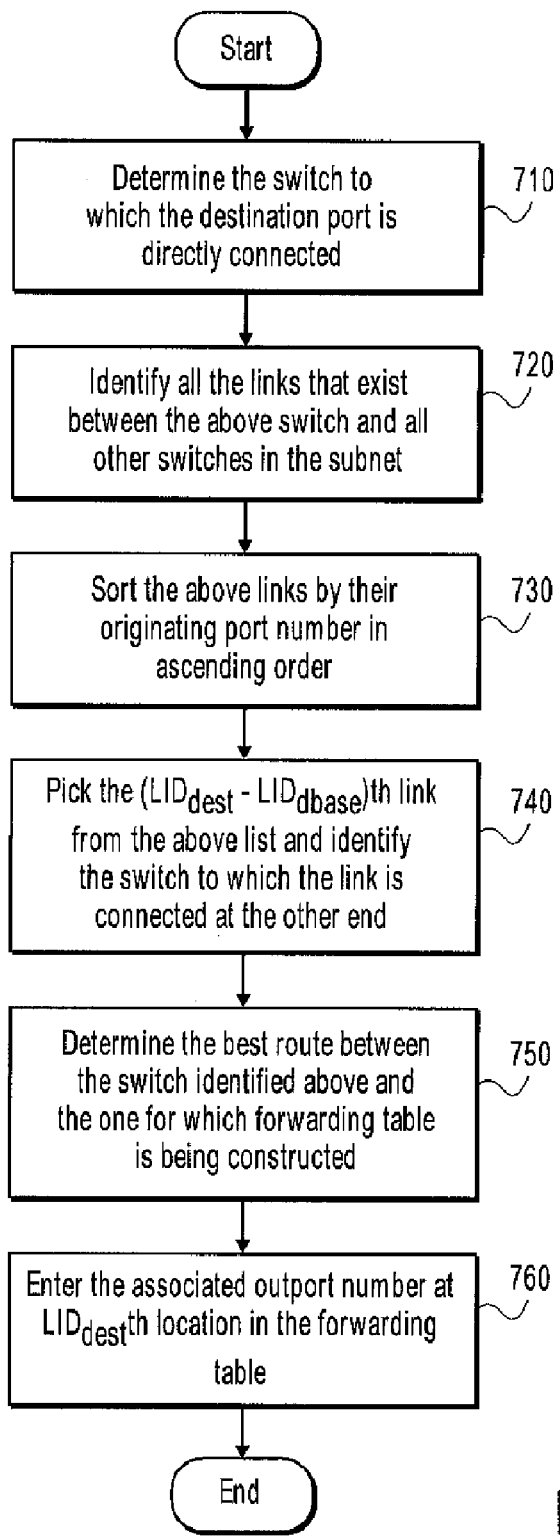
FIG. 7 illustrates an example high-level flowchart for programming switch forwarding tables for switches in an example IBA subnet according to an embodiment of the present invention.

During the process of building a forwarding table 510 for a switch as shown in FIG. 7, the subnet manager (SM) 450A considers one LID, referred to as a destination LID, at a time to determine the right switch port for routing. The port that corresponds to the destination LID is referred to as the destination port. The multipath assignment algorithm 500 first determines the switch, referred to as the destination switch, to which the destination port is directly connected at block 710. The multipath assignment algorithm 500 then identifies all the links that exist between the destination switch and other switches in the IBA subnet 400 at block 720. The number of paths configured and administered by the subnet administrator (SA) 450B to a destination switch (and hence the destination port) is controlled by the number of direct link connections to other switches from the destination switch. Thus, the number of paths administered between the host system 130 and the remote IOU 170 in the IBA subnet 400 shown in FIG. 4 per the multipath assignment algorithm 500 is four (4). This is due to the fact that switch S3, to which the remote IOU 170 is connected, has four (4) physical links L2, L3, L9 and L10 connected to other switches in the IBA subnet 400.

After identifying the paths, the multipath assignment algorithm 500 uses a simple technique to assign a LID/LMC combination consistently to a specific path. All the direct links that connect the destination switch to other switches are sorted in an ascending order into a list O(i), based on the port numbers from where they originate at block 730. The list O(i) contains an array containing LIDs of switches that are connected at the other end of N direct links identified above.

The multipath assignment algorithm 500 picks the appropriate link [($LID_{dest}$-$LID_{base}$)th link] from the list O(i) and identifies the switch to which the link is connected at the other end at block 740.

Next, the multipath assignment algorithm 500 uses the all-switch shortest paths table (TABLE 2) in order to look up for the best route between the switch identified and the switch ($LID_s$) for which forwarding table 510 is being built at block 750. The multipath assignment algorithm 500 picks the associated port number of switch $LID_s$ from the TABLE 2 and enters the same at a designated location in the forwarding table 510 at block 760.

Thus, each of the LID/LMC combination is assigned sequentially to paths that traverse each of the sorted links in the list O(i). The path that traverses port, "P1" of switch (S3) 430 is assigned $LID_{dbase}$+0 and the path that traverses port, "P4" of switch (S3) 430 is assigned $LID_{dbase}$+3 in the IBA subnet 400 shown in FIG. 4. In addition, the all-switch shortest paths table shown in TABLE 2 contains the path cost between each switch pair. The subnet administrator (SA) 450B can utilize this data and list O(i) in order to respond consistently to the clients' requests for paths with specific costs.

TABLE 3 shows a sample forwarding table 510 built using multipath assignment algorithm 500 discussed for switch (S1) 410 shown in FIG. 4.

| LID | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| Outport | 0 | 0 | 0 | 0 | 0 | 0 | 0 | 0 | 0 | 0 | 0 | 0 | 0 | 0 | 0 | 0 |
| LID | 10 | 11 | 12 | 13 | 14 | 15 | 16 | 17 | 18 | 19 | 1a | 1b | 1c | 1d | 1e | 1f |
| Outport | 0 | 0 | 0 | 0 | 0 | 0 | 0 | 0 | 0 | 0 | 0 | 0 | 0 | 0 | 0 | 0 |
| LID | 20 | 21 | 22 | 23 | 24 | 25 | 26 | 27 | 28 | 29 | 2a | 2b | 2c | 2d | 2e | 2f |
| Outport | 1 | 0 | 0 | 0 | 0 | 0 | 0 | 0 | 0 | 0 | 0 | 0 | 0 | 0 | 0 | 0 |
| LID | 30 | 31 | 32 | 33 | 34 | 35 | 36 | 37 | 38 | 39 | 3a | 3b | 3c | 3d | 3e | 2f |
| Outport | 1 | 3 | 4 | 2 | 2 | 0 | 0 | 0 | 0 | 0 | 0 | 0 | 0 | 0 | 0 | 0 |
| LID | 40 | 41 | 42 | 43 | 44 | 45 | 46 | 47 | 48 | 49 | 4a | 4b | 4c | 4d | 4e | 4f |
| Outport | 1 | 0 | 0 | 0 | 0 | 0 | 0 | 0 | 0 | 0 | 0 | 0 | 0 | 0 | 0 | 0 |
| LID | 50 | 51 | 52 | 53 | 54 | 55 | 56 | 57 | 58 | 59 | 5a | 5b | 5c | 5d | 5e | 5f |
| Outport | 2 | 1 | 3 | 4 | 0 | 0 | 0 | 0 | 0 | 0 | 0 | 0 | 0 | 0 | 0 | 0 |
| LID | 60 | 61 | 62 | 63 | 64 | 65 | 66 | 67 | 68 | 69 | 6a | 6b | 6c | 6d | 6e | 6f |
| Outport | 1 | 0 | 0 | 0 | 0 | 0 | 0 | 0 | 0 | 0 | 0 | 0 | 0 | 0 | 0 | 0 |
| LID | 70 | 71 | 72 | 73 | 74 | 75 | 76 | 77 | 78 | 79 | 7a | 7b | 7c | 7d | 7e | 7f |
| Outport | 0 | 0 | 0 | 0 | 0 | 0 | 0 | 0 | 0 | 0 | 0 | 0 | 0 | 0 | 0 | 0 |

Example Switch Forwarding Table Built for Switch S1

Once the forwarding tables 510A–510N are built for all switches in an IBA subnet 400, including switch (S1) 410, switch (S2) 420, switch (S3) 430 and switch (S4) 440, the forwarding tables 510A–510N are then downloaded into respective switches in the IBA subnet 400 for routing data packets via multiple paths established. For example, if the IBA subnet 400 has four (4) switches as shown in FIG. 4, then the subnet manager (SM) 450A must build forwarding tables 510A–510N for all four (4) switches respectively. Therefore, four (4) forwarding tables 510A–510N need to be built by the subnet manager (SM) 450A before those forwarding tables 510A–510N are downloaded into respective switches after the topology discovery. The structure of these forwarding tables 510A–510N should remain the same for all switches in an IBA subnet 400. However, the contents of the forwarding tables 510A–510N are different for different switches in an IBA subnet 400, such as switch (S1) 410, switch (S2) 420, switch (S3) 430 and switch (S4) 440.

Figure 8:
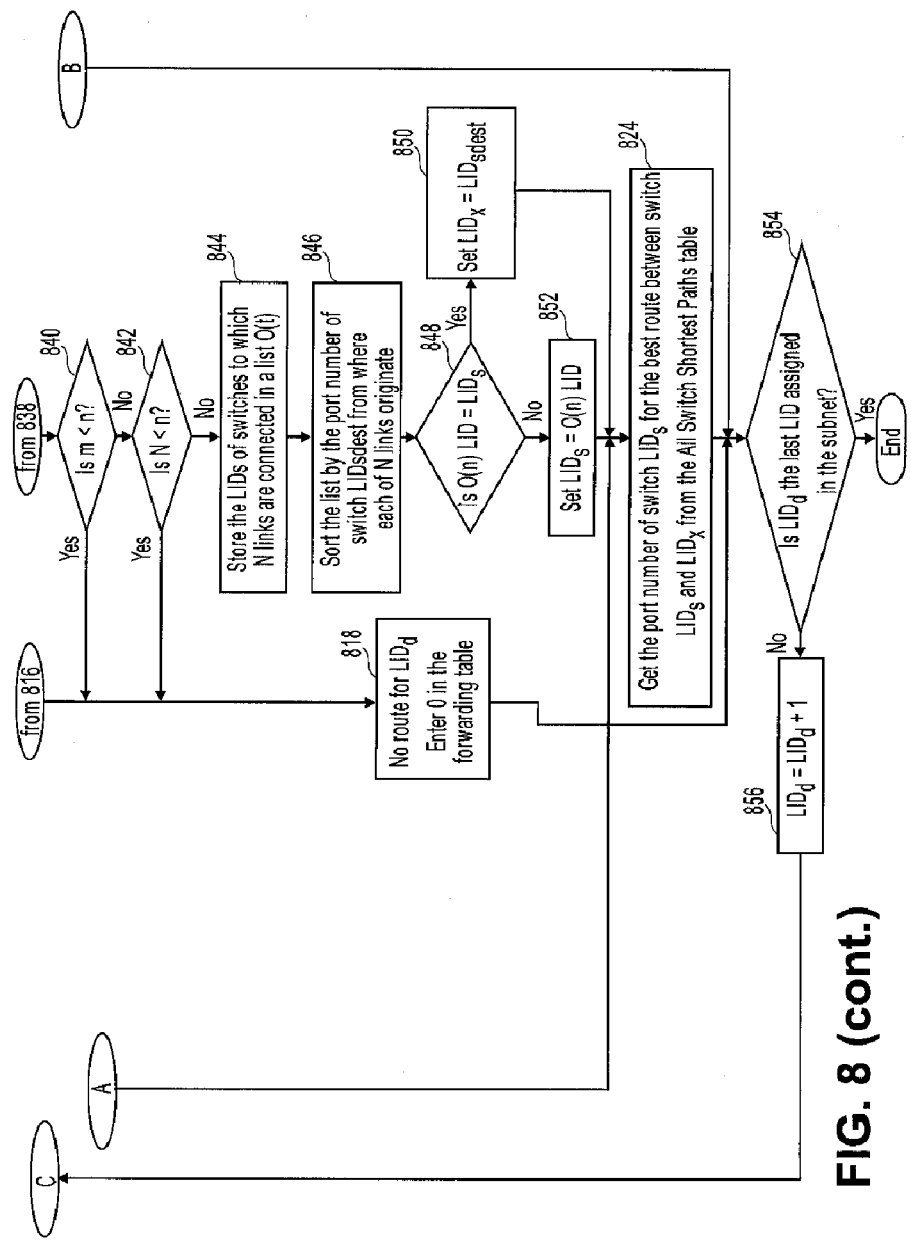
FIG. 8 illustrates an example detailed level flowchart for programming switch forwarding tables for switches in an example IBA subnet when multiple Local Identifiers (LIDs) are assigned to channel adapter (CA) ports according to an embodiment of the present invention.

FIG. 8 illustrates a detailed flowchart for programming forwarding tables for switches in an IBA subnet 400 when multiple LID assignment to channel adapter (CA) ports is desired. The subnet manager (SM) 450A is inputted with the number of multiple paths (m) for configuration and the LID of the switch $LID_s$ for which the forwarding table 510 is being built at block 810. Each iteration of the flowchart attempts to identify the right outport of switch $LID_s$ through which packets destined to $LID_d$ be routed.

The subnet manager (SM) 450A first determines the base LID ($LID_{dbase}$) for $LID_d$ (LID in the forwarding table 510 for which the SM 450A is currently identifying the correct outport) at block 812. For instance, if the desired number of multipaths is set to four (4) and $LID_d$ is set to five (5), the base LID of $LID_d$ is four (4), which is the beginning address of that port. This is because with the multipaths (m) set to 4, each CA port in the IBA subnet 400 is assigned four (4) LIDs. Assuming the subnet manager (SM) 450A begins assigning addresses from 4, the first channel adapter (CA) port is assigned "4", "5", "6" and "7", the next port "8", "9", "10" and "11", the third port "12", "13", "14" and "15" etc. Base LID is numerically the lowest LID that refers to a port.

Therefore, the base LID of the first port is "4". Similarly, the base LID of the second port is "8". Likewise the base LID of the third port is "12" and so forth.

The subnet manager (SM) 450A then determines if the base LID $LID_{dbase}$ of $LID_d$ corresponds to a switch using the all port connectivity table (TABLE 1) at block 814. In case $LID_{dbase}$ is same as $LID_s$, this implies that all the packets with destination LID set to $LID_d$ are destined for the same switch that the forwarding table 510 is currently being built. Therefore, such packets may not be routed out of switch $LID_s$. Thus, a zero (0) is entered for $LID_d$ in the corresponding forwarding table entry at block 818. The sequence of steps to program the forwarding table 510 for the current $LID_d$ is now complete and the multipath assignment algorithm 500 will iterate for the next destination LID $LID_d$.

However, if the subnet manager (SM) 450A determines that the base $LID_{dbase}$ of $LID_d$ corresponds to some other switch in the IBA subnet 400 and $LID_d$ indeed is the base LID of the port, then the algorithm 500 simply looks up the all switch shortest paths table (TABLE 2) to pick the outport of $LID_s$ that corresponds to the shortest path between switch $LID_s$ and switch $LID_{dbase}$ at block 824. Note that multipathing is valid and configurable only for CA ports and not switches. Therefore, the algorithm 500 considers only the base LID of $LID_d$, ignoring all other additional multipath $LID_d$s when $LID_{dbase}$ corresponds to a switch at block 818.

The switch-to-switch connectivity information is fundamental to the invention disclosed here. Therefore, the algorithm 500 at this stage attempts to check if the destination port with base LID $LID_{dbase}$ is connected to a switch from the all port connectivity table (TABLE 1) at blocks 826 and 828. If not, the destination port and the link that connects it with its peer will not be visible to the subnet manager (SM) 450A. Such a connection is considered private and hence cannot be administrated by the subnet manager (SM) 450A and the subnet administrator (SA) 450B. Thus, a zero (0) is entered for $LID_d$ in the corresponding forwarding table entry at block 818. The sequence of steps to program the forwarding table 510 for the current $LID_d$ is now complete and the algorithm 500 will iterate for the next destination LID $LID_d$.

If the peer node is a switch with LID $LID_{sdest}$ at block 828, the subnet manager (SM) 450A first checks to see if $LID_{sdest}$ and $LID_s$ are the same at block 830. If so, the destination port and the switch for which the forwarding table 510 is being built are directly connected. Therefore, the subnet manager (SM) 450A gets the appropriate port number of switch $LID_s$ from the all port connectivity table (TABLE 1) at block 832 and then moves on to iterate for the next destination LID $LID_d$.

However, if the peer switch $LID_{sdest}$ happens to be any switch other than the switch for which the forwarding table is being built at block 830, the subnet manager (SM) 450A identifies all the links (N) that are directly connected to all other switches from the peer switch LID ($LID_{sdest}$) at block 834. If no such links are found, it implies that only one switch $LID_{sdest}$ is reachable from the destination port $LID_d$. Multipathing can only be administered to a destination port that is reachable by two (2) or more switches. Hence, a zero (0) is entered for $LID_d$ in the corresponding forwarding table entry at block 818. The sequence of steps to program the forwarding table 510 for the current $LID_d$ is now complete and the algorithm 500 will iterate for the next destination LID $LID_d$.

Finally, multipathing can now possibly be configured for the destination port $LID_d$ if N happens to be a non-zero value at block 836. The subnet manager (SM) 450A determines the ordinal value of the path corresponding to $LID_d$ in block 838 and uses it to check if all the required multipaths (m) have already been configured in block 840. The subnet manager (SM) 450A also checks to see if there are sufficient number of switch-switch links between the switch $LID_{sdest}$ and others in the subnet in block 842. If either of the checks in blocks 840 and 842 is not satisfied, no path needs to be attributed to $LID_d$. A zero (0) is entered for $LID_d$ in the corresponding forwarding table entry at block 818. The sequence of steps to program the forwarding table 510 for the current $LID_d$ is now complete and the algorithm 500 will iterate for the next destination LID $LID_d$.

In case there are enough switch-to-switch links (N) from $LID_{sdest}$ are available at block 840 and block 842, the subnet manager (SM) 450A maintains a list of LIDs of switches to which N links are connected in O(i). The list is sorted in an ascending order by the port number of switch $LID_{sdest}$ from where each of N links originate in blocks 844 and 846.

The subnet manager (SM) 450A then picks the switch LID from O(n), the nth element in the list O(i), and checks if the LID corresponds to the switch LID ($LID_s$) for which the forwarding table 510 is being built at block 848. If the LID corresponds to the switch LID ($LID_s$) for which the forwarding table 510 is being built, the multipath assignment algorithm 500 simply looks up the all switch shortest paths table (TABLE 2) to pick the outport of $LID_s$ that corresponds to the shortest path between switch $LID_s$ and switch $LID_{dbase}$ at block 824. Otherwise, the algorithm 500 picks the outport of LIDs that corresponds to the shortest path between LIDs and LID in the nth element of O(i).

The multipath assignment algorithm 500 for programming the forwarding table 510 will eventually end, when $LID_d$ is the last LID assigned to a port or switch in the IBA subnet 400 at block 854 and block 856.

As described from the foregoing, the present invention advantageously provides a mechanism that allows the subnet manager (SM) to determine the number of possible multiple paths for a given port and program the switch forwarding tables accordingly. The multipath assignment algorithm allows the IBA subnet to retain the desirable properties associated with multipathing avoiding potential loops while keeping the subnet manager (SM) design simple. The multipath assignment algorithm is utilized to reduce the time and space complexity of the subnet manager (SM). In addition, the multipath assignment algorithm is flexible and allows a metric other than path length to be used to prune out paths. These properties assist in achieving the end result of a functional and high performance cluster and promote the use of clusters based on NGIO/InfiniBand™ technology.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the computer network as shown in FIGS. 1–4 may be configured differently or employ some or different components than those illustrated. Such computer network may include a local area network (LAN), a wide area network (WAN), a campus area network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. In addition, the subnet manager (SM) and subnet administrator (SA) may be integrated and installed at any node of the IBA subnet. The algorithm shown in FIGS. 7–8 may be configured differently or employ some or different components than those illustrated without changing the basic function of the invention. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A method for programming forwarding tables for switches for multipathing in a subnet of a switched fabric including at least a host system, a target system and switches each having one or more ports interconnected via links, each port having multiple local identifiers (LIDs) assigned thereto for multipathing, said method comprising:

determining all possible links between all ports on the subnet during topology discovery;

creating an all port connectivity table which records all port-to-port connectivity information;

creating an all switch shortest paths table which records all the shortest paths between every switch pair on the subnet based on the port-to-port connectivity information; and computing forwarding tables for respective switches on the subnet that allow usage of multiple paths between switch pairs based on the port-to-port connectivity information and based on the shortest paths between every switch pair.

2. The method as claimed in claim 1, further comprising:

downloading the forwarding tables to respective switches on the subnet that allow usage of multiple paths between switch pairs; and enabling respective switches on the subnet to route data packets from the host system to the target system via multiple paths through the switched fabric.

3. The method as claimed in claim 1, wherein said forwarding tables are computed based on the principle that only the shortest path between a given switch pair is guaranteed to overlap with other shortest paths that either originate from or destined to some intermediate port that exists on the shortest path between the original switch pair.

4. The method as claimed in claim 1, wherein a forwarding table for a switch is computed by:
  determining a destination switch to which a destination port is directly connected;
  identifying all the links that exist between the destination switch and other switches in the subnet;
  sorting all the links by respective originating port number in an ascending order;
  picking an appropriate link and identifying the switch to which the link is connected at the other end;
  determining the best route between the switch identified and the switch for which the forwarding table is being constructed; and
  inputting associated outport number at a designated location in the forwarding table.

5. The method as claimed in claim 1, wherein said shortest paths between every switch pair are computed utilizing an All Pair Shortest Paths (APSP) algorithm, and each shortest path from the source to the destination switch is represented by a <Port, Cost> duple in which port is the port number of the source switch where the path originates and cost is the path cost metric that is computed based on a hop count, a message transfer (MTU) size, a link speed, width and other port and link characteristics.

6. A method for programming forwarding tables for switches for multipathing in a subnet of a switched fabric including at least a host system, a target system and switches each having one or more ports interconnected via links, said method comprising:
  determining all possible links between all ports on the subnet during topology discovery;
  creating an all port connectivity table which records all port-to-port connectivity information;
  creating an all switch shortest paths table which records all the shortest paths between every switch pair on the subnet based on the port-to-port connectivity information; and
  computing forwarding tables for respective switches on the subnet that allow usage of multiple paths between switch pairs based on the port-to-port connectivity information and based on the shortest paths between every switch pair;
  wherein each of said host system and said target system includes a channel adapter (CA) installed supporting one or more ports with each port having multiple local identifiers (LIDs) assigned thereto for multipathing.

7. The method as claimed in claim 6, wherein each port on the subnet supports a unique 16-bit LID and a LID Mask Control (LMC) which specifies the number of low order bits of the LID to mask when checking a received destination LID against the port's destination LID.

8. The method as claimed in claim 7, wherein a forwarding table for a switch is computed by:
  determining a destination switch to which a destination port is directly connected,
  identifying all the links that exist between the destination switch and other switches in the subnet;
  sorting all the links by respective originating port number in an ascending order;
  picking an appropriate link and identifying the switch to which the link is connected at the other end;
  determining the best route between the switch identified and the switch for which the forwarding table is being constructed; and
  inputting associated outport number at a designated location in the forwarding table.

9. The method as claimed in claim 7, wherein each of said forwarding tables for switches in the subnet is computed, when multiple LIDs are assigned to channel adapter (CA) ports, by a multipath assignment algorithm configured to:
  receive information during the topology discovery including the number of multiple paths (m) for configuration, the switch LID for which the forwarding table is being built ($LID_s$), and the LID in the forwarding table which is currently identifying the correct outport ($LID_d$) for forwarding data packets;
  determine the base LID ($LID_{dbase}$) for the given $LID_d$ and determine if the base LID ($LID_{dbase}$) for the given $LID_d$ corresponds to a switch using the all port connectivity table;
  if the base LID ($LID_{dbase}$) for the given $LID_d$ corresponds to a switch using the all port connectivity table, check if the base LID ($LID_{dbase}$) for the given $LID_d$ corresponds to the switch LID for which the forwarding table is being built ($LID_s$);
  if the base LID ($LID_{dbase}$) for the given $LID_d$ corresponds to the switch LID for which the forwarding table is being built ($LID_s$), indicate that there is no route for the given $LID_d$;
  if the base LID ($LID_{dbase}$) for the given $LID_d$ happens to be any switch other than the switch LID for which the forwarding table is being built ($LID_s$), check if the base LID ($LID_{dbase}$) for the given $LID_d$ corresponds to the given $LID_d$;
  if the base LID ($LID_{dbase}$) for the given $LID_d$ corresponds to the given $LID_d$, set an arbitrary LIDx as the base LID ($LID_{dbase}$) for the given $LID_d$, and proceed to get the port number of switch $LID_s$ for the best route between switch $LID_s$ and LIDx from the all switch shortest paths table;
  if the base LID ($LID_{dbase}$) for the given $LID_d$ does not correspond to a switch using the all port connectivity table, identify the peer node and port to which the port with $LID_{dbase}$ is connected from the all port connectivity table and determine if the peer node is a switch;
  if the peer node does not correspond to a switch, indicate that there is no route for the given $LID_d$;
  if the peer node corresponds to a switch, determine if the peer switch LID ($LID_{sdest}$) corresponds to the switch LID for which the forwarding table is being built ($LID_s$);
  if the peer switch LID ($LID_{sdest}$) corresponds to $LID_s$, determine that the switch $LID_s$ and port $LID_{dbase}$ are directly connected, and get the appropriate port number of switch $LID_s$ from the all port connectivity table;
  if the peer switch LID ($LID_{sdest}$) does not correspond to $LID_s$, identify all the links that are directly connected to other switches from the peer switch LID ($LID_{sdest}$) and determine the number of (N) links that connect switch $LID_{sdest}$ where N is greater than "0";
  if the number of (N) links is not greater than "0", indicate that there is no route for the given $LID_d$;
  if the number of (N) links is greater than "0", set the offset (n) of $LID_d$ from $LID_{dbase}$, and determine if the number of multipaths (m) is less than the offset (n) of $LID_d$ from $LID_{dbase}$ and if the number of (N) links that connect switch $LID_{sdest}$ to other switch ports is less than the offset (n) of $LID_d$ from $LID_{dbase}$;
  if either the multipaths (m) or the (N) links is less than the offset (n) of $LID_d$ from $LID_{dbase}$, indicate that there is no route for the given $LID_d$;
  if neither the multipaths (m) nor the (N) links is less than the offset (n) of $LID_d$ from $LID_{dbase}$, store the LIDs of switches to which N links are connected in a list O(i) and sort the list by the port number of switch $LID_{sdest}$ from where each of N links originate in an ascending order;

set the list O(i).LID to the LID of the switch that the link O(n) is connected at the other end, and check if O(i).LID corresponds to the switch LID for which the forwarding table is being built ($LID_s$);

if the list O(i).LID corresponds to the switch LID for which the forwarding table is being built ($LID_s$), set an arbitrary LIDx as the LID of the switch to which the port $LID_d$ is directly connected ($LID_{sdest}$) and then get the port number of switch $LID_s$ for the best route between switch $LID_s$ and LIDx from the all switch shortest paths table;

if the list O(i).LID does not correspond to the switch LID for which the forwarding table is being built ($LID_s$), set an arbitrary LIDx as the O(n).LID, and then get the port number of switch $LID_s$ for the best route between switch $LID_s$ and LIDx from the all switch shortest paths table; and determine if the $LID_d$ is the last LID assigned to a port or switch in the subnet, and terminate computation of the forwarding table when $LID_d$ is the last LID assigned to a port or switch in the subnet.

10. A method for programming forwarding tables for switches for multipathing in a subnet of a switched fabric including at least a host system, a target system and switches each having one or more ports interconnected via links, said method comprising:

determining all possible links between all ports on the subnet during topology discovery;

creating an all port connectivity table which records all port-to-port connectivity information;

creating an all switch shortest paths table which records all the shortest paths between every switch pair on the subnet based on the port-to-port connectivity information; and computing forwarding tables for respective switches on the subnet that allow usage of multiple paths between switch pairs based on the port-to-port connectivity information and based on the shortest paths between every switch pair;

wherein said forwarding tables are computed to ensure loop-less paths and allow ports to be addressed by multiple local identifiers (LIDs), and wherein said all-port connectivity and all-switch shortest paths tables are constantly updated reflecting any dynamic changes to the subnet topology.

11. A data network, comprising:

a host system having at least one channel adapter (CA) installed therein supporting one or more ports with each port having multiple local identifiers (LIDs) assigned thereto for multipathing;

at least one target system having at least one channel adapter (CA) installed therein supporting one or more ports with each port having multiple local identifiers (LIDs) assigned thereto for multipathing;

a switched fabric comprising a plurality of different switches which interconnect said host system via CA ports to said remote system via CA port along different physical links for data communications; and a fabric manager provided in said host system for making topology discovery, assigning local identifiers (LIDs) to all ports that are connected in the switched fabric, and programming forwarding tables for switches in the switched fabric, wherein said fabric manager programs forwarding tables for switches for multipathing by:

determining all possible links between all ports that are connected in the switched fabric during topology discovery;

creating an all port connectivity table which records all port-to-port connectivity information;

creating an all switch shortest paths table which records all the shortest paths between every switch pair on the switched fabric based on the port-to-port connectivity information; and computing forwarding tables for respective switches on the switched fabric that allow usage of multiple paths between switch pairs based on the port-to-port connectivity information and based on the shortest paths between every switch pair.

12. The data network as claimed in claim 11, wherein said fabric manager is configured to download the forwarding tables to respective switches on the switched fabric that allow usage of multiple paths between every switch pair, and enable respective switches on the switched fabric to route data packets from the host system to the target system via multiple paths through the switched fabric.

13. The data network as claimed in claim 11, wherein each port on the subnet supports a unique 16-bit LID and a LID Mask Control (LMC) which specifies the number of low order bits of the LID to mask when checking a received destination LID against the port's destination LID.

14. The data network as claimed in claim 11, wherein said forwarding tables are computed to ensure loop-less paths and allow ports to be addressed by multiple local identifiers ($LID_s$), and wherein said all-port connectivity and all-switch shortest paths tables are constantly updated reflecting any dynamic changes to the subnet topology.

15. The data network as claimed in claim 11, wherein said forwarding tables are computed based on the principle that only the shortest path between a given switch pair is guaranteed to overlap with other shortest paths that either originate from or destined to some intermediate port that exists on the shortest path between the original switch pair.

16. The data network as claimed in claim 11, wherein said fabric manager is configured to compute a forwarding table for a switch by:

determining a destination switch to which a destination port is directly connected, identifying all the links that exist between the destination switch and other switches in the subnet;

sorting all the links by respective originating port number in an ascending order;

picking an appropriate link and identifying the switch to which the link is connected at the other end;

determining the best route between the switch identified and the switch for which the forwarding table is being constructed; and inputting associated outport number at a designated location in the forwarding table.

17. The data network as claimed in claim 11, wherein said shortest paths between every port pair are computed utilizing an All Pair Shortest Paths (APSP) algorithm, and each shortest path from the source to the destination switch is represented by a <Port, Cost> duple in which port is the port number of the source switch where the path originates and cost is the path cost metric that is computed based on a hop count, a message transfer (MTU) size, a link speed, width and other port and link characteristics.

18. The data network as claimed in claim 11, wherein said fabric manager is provided with an algorithm for computing forwarding tables for switches, when multiple LIDs are assigned to channel adapter (CA) ports, by:

receiving information during the topology discovery including the number of multiple paths (m) for configuration, the switch LID for which the forwarding table is being built ($LID_s$), and the LID in the forwarding table which is currently identifying the correct outport ($LID_d$) for forwarding data packets;

determining the base LID ($LID_{dbase}$) for the given $LID_d$ and if the base LID ($LID_{dbase}$) for the given $LID_d$ corresponds to a switch using the all port connectivity table;

if the base LID ($LID_{dbase}$) for the given $LID_d$ corresponds to a switch using the all port connectivity table, checking if the base LID ($LID_{dbase}$) for the given $LID_d$ corresponds to the switch LID for which the forwarding table is being built ($LID_s$);

if the base LID ($LID_{dbase}$) for the given $LID_d$ corresponds to the switch LID for which the forwarding table is being built ($LID_s$), indicating that there is no route for the given $LID_d$;

if the base LID ($LID_{dbase}$) for the given $LID_d$ happens to be any switch other than the switch LID for which the forwarding table is being built ($LID_s$), checking if the base LID ($LID_{dbase}$) for the given $LID_d$ corresponds to the given $LID_d$;

if the base LID ($LID_{dbase}$) for the given $LID_d$ corresponds to the given $LID_d$, setting an arbitrary LIDx as the base LID ($LID_{dbase}$) for the given $LID_d$, and getting the port number of switch $LID_s$ for the best route between switch $LID_s$ and LIDx from the all switch shortest paths table;

if the base LID ($LID_{dbase}$) for the given $LID_d$ does not correspond to a switch using the all port connectivity table, identifying the peer node and port to which the port with $LID_{dbase}$ is connected from the all port connectivity table and determining if the peer node is a switch;

if the peer node does not correspond to a switch, indicating that there is no route for the given $LID_d$;

if the peer node corresponds to a switch, determining if the peer switch LID ($LID_{sdest}$) corresponds to the switch LID for which the forwarding table is being built ($LID_s$);

if the peer switch LID ($LID_{sdest}$) corresponds to $LID_s$, determining that the switch $LID_s$ and port $LID_{dbase}$ are directly connected, and getting the appropriate port number of switch $LID_s$ from the all port connectivity table;

if the peer switch LID ($LID_{sdest}$) does not correspond to $LID_s$, identifying all the links that are directly connected to other switches from the peer switch LID ($LID_{sdest}$) and determining the number of (N) links that connect switch $LID_{sdest}$ where N is greater than "0";

if the number of (N) links is not greater than "0", indicating that there is no route for the given $LID_d$;

if the number of (N) links is greater than "0", setting the offset (n) of $LID_d$ from $LID_{dbase}$, and determining if the number of multipaths (m) is less than the offset (n) of $LID_d$ from $LID_{dbase}$ and if the number of (N) links that connect switch $LID_{sdest}$ to other switch ports is less than the offset (n) of $LID_d$ from $LID_{dbase}$;

if either the multipaths (m) or the (N) links is less than the offset (n) of $LID_d$ from $LID_{dbase}$, indicating that there is no route for the given $LID_d$;

if neither the multipaths (m) nor the (N) links is less than the offset (n) of $LID_d$ from $LID_{dbase}$, storing the LIDs of switches to which N links are connected in a list O(i) and sorting the list by the port number of switch $LID_{sdest}$ from where each of N links originate in an ascending order;

setting the list O(i).LID to the LID of the switch that the link O(n) is connected at the other end, and checking if O(i).LID corresponds to the switch LID for which the forwarding table is being built ($LID_s$);

if the list O(i).LID corresponds to the switch LID for which the forwarding table is being built ($LID_s$), setting an arbitrary LIDx as the LID of the switch to which the port $LID_d$ is directly connected ($LID_{sdest}$) and then getting the port number of switch $LID_s$ for the best route between switch $LID_s$ and LIDx from the all switch shortest paths table;

if the list O(i).LID does not correspond to the switch LID for which the forwarding table is being built ($LID_s$), setting an arbitrary LIDx as the O(n).LID, and then getting the port number of switch $LID_s$ for the best route between switch $LID_s$ and LIDx from the all switch shortest paths table; and determining if the $LID_d$ is the last LID assigned to a port or switch in the subnet, and terminating computation of the forwarding table when $LID_d$ is the last LID assigned to a port or switch in the subnet.

19. A computer readable medium comprising instructions that, when executed by a computer system, cause the computer system to:

determine all possible links between all ports on a subnet including at least a host system, a target system and switches each having one or more ports interconnected via links during topology discovery, each port having multiple local identifiers (LIDs) assigned thereto for multipathing;

create an all port connectivity table which records all port-to-port connectivity information;

create an all switch shortest paths table which records all the shortest paths between every port pair on the subnet based on the port-to-port connectivity information; and compute forwarding tables for respective switches on the subnet that allow usage of multiple paths between port pairs based on the port-to-port connectivity information and based on the shortest paths between every port pairs.

20. The computer readable medium as claimed in claim 19, further causing the computer system to:

download the forwarding tables to respective switches on the subnet that allow usage of multiple paths between port pairs; and enable respective switches on the subnet to route data packets from the host system to the target system via multiple paths through the switched fabric.

21. The computer readable medium as claimed in claim 19, wherein each port on the subnet supports a unique 16-bit LID and a LID Mask Control (LMC) which specifies the number of low order bits of the LID to mask when checking a received destination LID against the port's destination LID.

22. The computer readable medium as claimed in claim 19, wherein said forwarding tables are computed to ensure loop-less paths and allow ports to be addressed by multiple local identifiers (LIDs), and wherein said all-port connectivity and all-switch shortest paths tables are constantly updated reflecting any dynamic changes to the subnet topology.

23. The computer readable medium as claimed in claim 19, wherein said forwarding tables are computed based on the principle that only the shortest path between a given port pair is guaranteed to overlap with other shortest paths that either originate from or destined to some intermediate port that exists on the shortest path between the original port pair.

24. The computer readable medium as claimed in claim 19, wherein a forwarding table for a switch is computed by:

determining a destination switch to which a destination port is directly connected, identifying all the links that exist between the destination switch and other switches in the subnet;

sorting all the links by respective originating port number in an ascending order;

picking an appropriate link and identifying the switch to which the link is connected at the other end;

determining the best route between the switch identified and the switch for which the forwarding table is being constructed; and inputting associated outport number at a designated location in the forwarding table.

25. The computer readable medium as claimed in claim 19, wherein said shortest paths between every switch pair are computed utilizing an All Pair Shortest Paths (APSP) algorithm, and each shortest path from the source to the destination switch is represented by a <Port, Cost> duple in which port is the port number of the source switch where the path originates and cost is the path cost metric that is computed based on a hop count, a message transfer (MTU) size, a link speed, width and other port and link characteristics.

* * * * *